S. B. WHEWAY.
FASTENING AND TENSIONING DEVICE FOR CHAINS.
APPLICATION FILED DEC. 20, 1917.
1,264,725.  Patented Apr. 30, 1918.
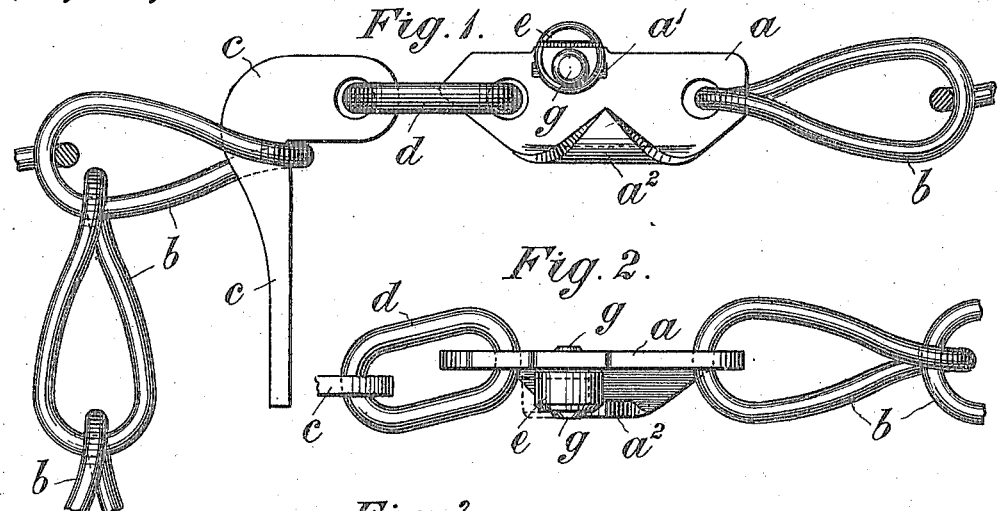
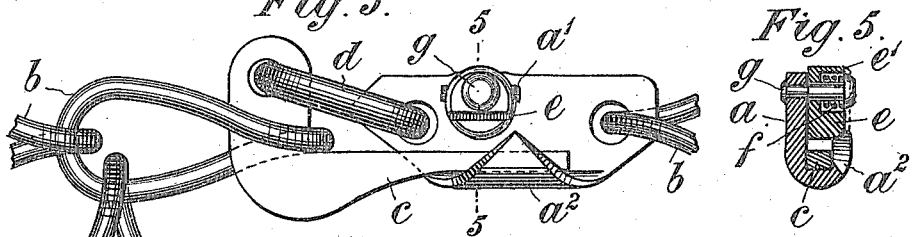
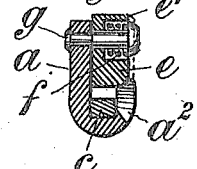
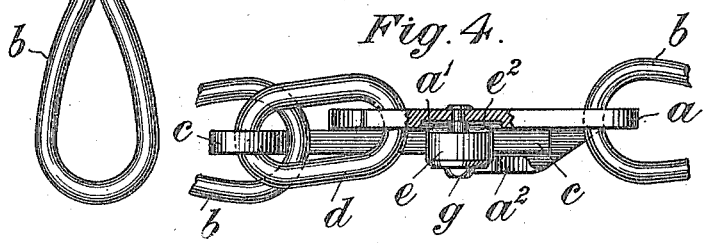
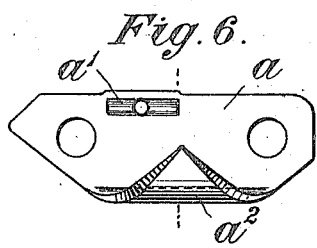
Inventor:— Sidney B. Wheway
by James L. Norris, Atty.
Witnesses

UNITED STATES PATENT OFFICE.

SYDNEY BENJAMIN WHEWAY, OF WALSALL, ENGLAND.

FASTENING AND TENSIONING DEVICE FOR CHAINS.

1,264,725.

Specification of Letters Patent.

Patented Apr. 30, 1918.

Application filed December 20, 1917. Serial No. 208,120.

*To all whom it may concern:*

Be it known that I, SYDNEY BENJAMIN WHEWAY, a subject of the King of Great Britain, residing at Birchills Hame and Chain Works, Walsall, England, have invented certain new and useful Improvements in Fastening and Tensioning Devices for Chains, of which the following is a specification.

My invention relates to fastening and tensioning devices for chains and the like comprising a tensioning or straining lever connected to the link at one end of the chain to be tensioned and fastened, the said lever being passed or threaded through a link at or near the other end of the chain and turned so as to bring the said lever alongside or parallel with the link to which it is connected means being provided for fastening and preventing the accidental disengagement of the parts of the straining device, and my invention consists of the construction and arrangement or combination of parts hereinafter described of such fastening and tensioning devices whereby they are rendered especially useful in connection with non-skid chains for the tires of the wheels of motor road vehicles.

According to my invention I introduce into the chain near one end a metal plate, preferably of a nearly triangular shape, one of the corners of the said plate being turned up to form a hook the bottom of which is parallel or approximately parallel with the upper edge of the plate. Near the angles or corners of the upper edge of the plate are holes to one of which one end of the chain for the fastening and tensioning of which the device is employed is connected, and to the other hole a single link is connected the said link carrying a cranked arm or tensioning lever. The said cranked arm or tensioning lever is passed through one of the links at or near the other end of the chain to be fastened and tensioned and the lever is turned so as to bring the part near its free end into engagement with the hook shaped part of the triangular plate. A projecting pin or spindle on the plate carries a cam or equivalent device which overhangs the arm or lever when in engagement with the hook of the triangular plate and by the turning of the cam or the like the tensioning arm or lever can be effectually locked in its fastened position and unlocked when desired. Means are preferably combined with the cam to prevent the accidental turning of the same.

I will further describe my invention in connection with the accompanying drawing.

Figure 1 represents in side elevation the chain fastening and tensioning device or appliance constituting my invention and end portions of the chain with which it is used the cranked arm or lever of the appliance being in the unfastened position.

Fig. 2 is a plan of the same.

Fig. 3 is a similar view to Fig. 1 with the cranked arm or lever in the fastened and locked position, and Fig. 4 is a plan partly in section of the same.

Fig. 5 is a cross section taken in the plane indicated by the dotted line 5—5 Fig. 3.

Figs. 6 to 11 both inclusive are views of the parts of the device detached hereinafter particularly described.

The same letters of reference indicate the same parts in the several figures of the drawing.

$a$ is the preferably triangular or nearly triangular plate of the device or appliance which plate $a$ is shown separately in front elevation, plan and cross section in Figs. 6, 7 and 8 respectively. The lower corner of the plate $a$ is turned up or nearly doubled on itself so as to form the hook $a^2$. To one of the ends of the plate $a$ one end of the chain $b$ to be fastened and tensioned by the device is connected, and to the other end of the plate the cranked arm or lever $c$ is connected by means of the link $d$.

The device or appliance is used as follows:—

The chain $b$ having been placed around the article with which it is to be used the cranked arm or lever $c$ is passed through that link of the chain $b$ most distant from the free end with which it can be engaged and after the same has been passed through the said link to the full extent as is represented in Figs. 1 and 2 the lever $c$ is turned or brought up to an extent proper to permit the said arm or lever to be engaged with the hook $a^2$ of the plate $a$ as is represented in Figs. 3, 4 and 5 which hook constitutes a seat for the said arm of the lever. By the turning or bringing up of the lever to engage the arm with the hook the requisite tension is put on the chain which is virtually shortened and tightened on the tire or other article with which it is used.

The accidental disengagement of the lever from the hook $a^2$ of the plate $a$ is prevented by the use in combination with the plate $a$ of the cam $e$, shown detached in side elevation in Fig. 9 and in front and back elevation in Figs. 10 and 11 respectively, the said cam $e$ overhanging the lever $c$ when engaged with the hook and being turned from the position represented in Fig. 1 into the position represented in Fig. 3 when it is desired to retain the arm or lever $c$ in place and the reverse when it is desired to disengage the lever $c$ from the hook $a^2$.

The cam $e$ is locked in one or other position preferably by forming on its rear face projections $e^2$ and making a recess $e^1$ in the front face of the cam $e$ for the accommodation of a spring $f$ on the shank or spindle $g$ by which the cam $e$ is secured to the plate $a$. In the front face of the plate $a$ is a groove $a^1$ (see Figs. 6 and 8) with which the projections $e^2$ engage when the cam $e$ is in one or other of the positions represented in Figs. 1 and 3. When the cam is turned by the aid of a screw driver or other like instrument or tool the projections $e^2$ in passing out of the groove $a^1$ cause the said cam $e$ to be advanced away from the plate $a$ as is indicated in dotted lines in Figs. 2 and 5 thereby compressing the spring $f$ bearing at one end against the head of the spindle $g$ and at its other end against the cam $e$. On the further rotation of the cam $e$ in one or other direction and the bringing of the projections $e^2$ into coincidence with the groove $a^1$ the spring $f$ presses the cam $e$ into its normal position against the plate $a$ and thereby secures or locks the cam $e$ against accidental turning movement.

The several parts of the device or appliance are preferably made of steel.

I claim:—

1. A fastening and tensioning device for chains and the like comprising a cranked arm or tensioning lever connected to one of the end links of the chain and a hook near the said end of the chain to which the cranked arm or lever is connected with which hook the cranked arm or lever can be engaged when it is turned and brought alongside the link and part of the chain to which it is attached and the combination therewith of means for preventing the accidental disengagement of the cranked arm or lever from the hook.

2. A tensioning and fastening device or appliance for the non-skid chains of motor tires and other chains consisting essentially of a plate having a hook-like part the said plate being connected to one end of the chain with which it is to be used and carrying an arm or lever which can be passed through one of the links near the other end of the chain, the chain being tightened or virtually shortened by the turning of the arm or lever in the direction proper to permit its engagement with the hook-like part of the plate, means being preferably provided for preventing the accidental disengagement of the arm or lever from the said hook-like part of the plate.

3. A tensioning and fastening device or appliance for chains, consisting of a plate connected to one end of the chain and having a side hook-like member projecting partially over one side, an arm or lever movably connected to the opposite extremity of the plate and operative to pass through one of the links of the chain and be turned over close to the side of the plate with the free extremity in engagement with the hook-like member, and a cam device rotatably carried by the plate on the same side of the plate as the hook-like member and having a maximum extent over the plate beyond the plane of the free end of the hook-like member to lock the free end of the arm or lever against accidental disengagement from said member.

4. A tensioning and fastening device or appliance for chains, consisting of a plate having one extremity connected to the chain and provided with a hook-like member projecting partially over one side, an arm or lever movably connected to the opposite extremity of the plate and operative to pass through one of the links of the chain and be turned over close to the side of the plate with the free extremity thereof in engagement with the hook-like member, and a cam device rotatably mounted on the same side of the plate as the hook-like member and having spring means to permit it to move outwardly from the plate, the plate having a recess and the cam provided with projecting means to engage said recess and lock the cam device against movement in either one of two positions, the cam device being projectable such distance over the side of the plate as to prevent accidental disengagement of the arm or lever from the hook-like member.

In testimony whereof I have hereunto set my hand in presence of two subscribing witnesses.

SYDNEY BENJAMIN WHEWAY.

Witnesses:
WILLIAM J. BOWKER,
ROBT. E. RICE.

Copies of this patent may be obtained for five cents each, by addressing the "Commissioner of Patents, Washington, D. C."